United States Patent
Perry et al.

(10) Patent No.: US 9,073,143 B2
(45) Date of Patent: Jul. 7, 2015

(54) AUTOMATION OF REACTION METALLURGICAL JOINING FOR COPPER CONDUCTORS

(75) Inventors: Thomas A. Perry, Bruce Township, MI (US); James G. Schroth, Troy, MI (US); David R. Sigler, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 415 days.

(21) Appl. No.: 13/564,781

(22) Filed: Aug. 2, 2012

(65) Prior Publication Data

US 2013/0056447 A1   Mar. 7, 2013

Related U.S. Application Data

(60) Provisional application No. 61/531,648, filed on Sep. 7, 2011.

(51) Int. Cl.
| | | |
|---|---|---|
| *B23K 15/00* | (2006.01) | |
| *B23K 11/00* | (2006.01) | |
| *B23K 11/06* | (2006.01) | |
| *B23K 11/11* | (2006.01) | |
| *B23K 11/30* | (2006.01) | |
| *B23K 11/31* | (2006.01) | |

(52) U.S. Cl.
CPC ............. *B23K 11/002* (2013.01); *B23K 11/066* (2013.01); *B23K 11/115* (2013.01); *B23K 11/3009* (2013.01); *B23K 11/3036* (2013.01); *B23K 11/3081* (2013.01); *B23K 11/31* (2013.01); *B23K 2201/38* (2013.01); *B23K 2203/12* (2013.01)

(58) Field of Classification Search
CPC ............... B23K 11/31; B23K 2201/38; B23K 2203/12; B23K 11/02; B23K 11/066; B23K 11/115; B23K 11/3009; B23K 11/3036; B23K 11/3087; H05H 1/26; H05H 1/28
USPC ............... 219/121.11, 121.45, 121.46, 85.14, 219/106, 85.1, 85.18
See application file for complete search history.

(56) References Cited

U.S. PATENT DOCUMENTS

| | | | |
|---|---|---|---|
| 4,331,286 A | | 5/1982 | Miyazaki |
| 4,460,658 A | * | 7/1984 | Bose et al. ................... 428/606 |
| 5,330,097 A | * | 7/1994 | Inoue ........................... 228/194 |
| 5,660,742 A | * | 8/1997 | Warner et al. ............ 219/85.16 |
| 6,621,037 B2 | * | 9/2003 | Gabbianelli et al. ............ 219/94 |
| 8,590,768 B2 | * | 11/2013 | Sigler et al. .................. 228/193 |
| 2003/0024969 A1 | * | 2/2003 | Harris ....................... 228/262.61 |
| 2010/0258537 A1 | | 10/2010 | Sigler et al. |
| 2011/0303736 A1 | | 12/2011 | Sigler et al. |
| 2012/0273557 A1 | | 11/2012 | Perry et al. |

FOREIGN PATENT DOCUMENTS

CN          1615202 A       5/2005

* cited by examiner

*Primary Examiner* — Mark Paschall
(74) *Attorney, Agent, or Firm* — Reising Ethington P.C.

(57) ABSTRACT

Copper conductor members or other copper-based workpieces are welded using a suitable copper alloy material that is reactive with the joining surfaces of the copper members. The reactive metal material may be applied as a thin metal foil strip between assembled facing joining surfaces. The members are pressed together against the reactive material and electrical resistance heated in forming the weld. Practices are adapted for forming many such welds in the pairs of facing ends of conductor bars or wires assembled, for example, in slots in a stator for a vehicle traction motor. Practices are disclosed for shaping and automated placement of suitably sized and shaped foils of reactive metal. Practices are also disclosed for use of a resistance welding tool in aligning and heating the many pairs of conductors to be welded.

23 Claims, 7 Drawing Sheets

AUTOMATION OF REACTION METALLURGICAL JOINING FOR COPPER CONDUCTORS

This application claims priority based on provisional application 61/531,648, titled "Automation of Reaction Metallurgical Joining for Copper Conductors", filed Sep. 7, 2011 and which is incorporated herein by reference.

TECHNICAL FIELD

This invention pertains to relatively low temperature methods of forming a strong weld between facing surfaces of copper workpieces. The weld is formed by a metallurgical reaction joining process that leaves a low electrical resistance, copper-to-copper weld between the workpieces. Such resulting welded joints are very desirable when formed between pairs of copper conductors in an electric motor. In welding such pairs of copper conductors, a thin metal alloy foil is placed between facing surfaces of the conductors and the conductors are pressed together against the foil using, for example, resistance welding electrodes which then direct a welding current through the conductors and foil in forming the weld. Practices of this invention provide ways for adapting forms and shapes of the thin metal foil for placement of reactive material between facing surfaces of the conductors. Practices are also provided for adapting the use of the welding electrodes for joining many pairs of conductors, for example, in the stator of an electric motor.

BACKGROUND OF THE INVENTION

While there are many welding practices used for joining workpieces of many metal compositions, there remains a need for a method of forming a sound, low resistance, welded joint with minimal deformation between two copper workpieces. There is a particular need for such a joining method for use in forming welded connections between separate pairs of copper conductor bars, in an assembly of many such copper conductor pairs, in a stator member of an electric traction motor for a vehicle. There is an additional need for a wire joining process that requires generation of minimal heat such that polymeric wire insulation near the joint is not degraded by thermal exposure.

SUMMARY OF THE INVENTION

As further background, this invention uses a metallurgical reaction joining process to form sound, strong, low electrical resistivity welds between facing surfaces of assembled copper workpieces. In an illustration of one embodiment of the invention, two copper conductor members in the form of wires or bars of small rectangular cross-section and like facing surfaces are placed and pressed together and joined at a welded interface. Thus, in this embodiment of the invention, the copper workpieces are substantially pure, high electrical conductivity, copper metal. In the metallurgical reaction process, a thin layer of a reactive metal or alloy is placed between the facing surfaces of the copper workpieces and is used to clean the surfaces to allow intimate contact over broad areas and the formation of a solid-state weld.

The reactive metal or metal alloy is selected to provide important functions as part of the welding process. Such a metallurgically reactive metal composition must form a mobile liquid phase through reaction with a small amount of material from each of the facing copper workpiece surfaces under the influence of applied heat. The liquid phase must have a solidus temperature that is lower than the melting point of the workpiece metal. And the mobile phase that is formed must be capable of removing oxide films initially present on the copper workpiece surfaces to be joined. Surface oxide removal is achieved during the reaction process, i.e., a layer on each workpiece surface is eliminated through a combination of dissolution of a portion of the copper workpieces and expulsion of the reacted metal under pressure.

In preferred embodiments of this invention, a thin metal strip of an alloy of about seven percent by weight phosphorus and the balance copper is a suitable reactive metal for joining substantially pure copper workpieces. Copper has a melting point of 1084° C. while copper-7 wt. % phosphorus alloy has a melting temperature of 710° C. And this copper-phosphorus alloy is capable of dissolving or fluxing the surface oxides present at the copper-to-copper workpiece interface or faying interface as well as reacting with and dissolving a portion of the copper workpieces. Another suitable reactive metal composition for welding copper is an alloy of copper with, by weight, 6% phosphorus, 6% tin, and 0.4% silicon. The process is conducted by placing a thin (for example, 50 to 250 microns thick) piece of the reactive metal between facing surfaces of the copper workpieces to be joined. The sandwich joint is then compressed and heated to a temperature well above the solidus temperature of the metal/reactive metal alloy system, i.e., above 710° C. when using the copper-7% phosphorus alloy, but well below the melting point of copper, i.e., below 1084° C. Beneficially, such reduced temperatures are effective in minimizing degradation of polymeric wire insulation near the joint.

A convenient method of compressing while heating is to use resistive heating, as is provided by engaging outer surfaces of the facing workpieces with opposing electrodes of a commercial spot welder. In some instances, the electrode faces may have surface geometries with local features that engage or indent the outer surfaces of the work pieces and tend to prevent them from sliding laterally, that is, perpendicular to the direction of clamping, during the application of weld current. The clamping force of the spot welder provides the required pressure as an electrical resistance heating current is passed between the electrodes and through the interface of the workpieces and thin strip of reactive metal. Once heated sufficiently, the metallurgical reaction begins and the reactive metal will liquefy and remove any native oxide on the base metal copper surface at the faying interface and further react with copper to form a liquid-containing phase. Increased applied pressure by the electrodes will also force the mobile liquid out of the copper-to-copper joint. In some cases, a semi-solid phase will exist of sufficiently low effective viscosity that it can be expelled from the joint, just as the case of a pure liquid. This expelled material carries any fluxed oxides or other prior surface-impurities with it to leave clean, copper surfaces. A very clean copper-to-copper weld is formed by this process. The formed joint is not primarily a brazed joint. Detailed microscopy of sections of a thus formed joint verifies that nearly all the reactive metal is expelled from the final copper workpiece-to-copper workpiece weld joint. The method is a relatively low energy method and a relatively low temperature method which can minimize the effect of the joining process on any nearby insulation on the copper workpieces or on other nearby articles.

The small amount of required heat arises for two reasons. First, the temperature required to form liquid in the P-containing alloy is much lower than the melting point of the copper base metal. Second, the P-containing alloy has very high electrical resistivity such that when current is passed through the system, the reactive material is heated rapidly while the surrounding copper undergoes only very minor resistive heating. Thus a joint can be made without heating a large volume of the copper wire.

The method of this invention may be used, for example, in the welding of each of many pairs of ends of copper wires or bars during the assembly and making of a stator for an electric traction motor for driving one or more wheels of an automotive vehicle. The copper wires may, for example, have a thin oxide coating on their surfaces. In making traction motor stators, conductor wire pieces, cut from a coil, are shaped as a "U" or open-loop shape (and sometimes called hairpins) for placement and assembly in slots on inner circumferences of an annular stack of laminated, ferrous metal, stator core plates. The wires or bars may, for example, have a rectangular cross-section and have flat sides of about two to about six millimeters with a range of from about two to four millimeters or so being more typical. The loop-shaped wires, with their cut ends, typically at the same side of the formed stator shape, are fitted into insulator-lined slots on and around the full inner circumferences of the annular-shaped stack of stator laminations. Most, if not all, of the ends of the conductor shapes are located at the same end of the stator body to facilitate welding. Each end of a stator conductor wire is to be welded to a closely spaced end of another conductor wire to provide, for example, closed electrical circuits for producing an electromagnetic field in the ferromagnetic stator core for driving a rotor member located within a finished stator in operation of a traction motor.

But whatever the assembly in which the joining process is used, facing surfaces of copper workpieces are pressed against a thin layer of reactive metal material, for example, up to about 250 micrometers in thickness and frequently fully covering the faying surfaces. As described above, the assembly is heated by any suitable means to melt the reactive material between the facing surfaces to be joined. The fluid reactive material serves to metallurgically clean the facing copper surfaces. As pressure is applied to the heated interface, the mobile liquefied reacted material and reaction products, which also include a small portion of the copper workpiece(s) that is dissolved during the reaction, are substantially completely squeezed from between the cleaned copper surfaces. And the pressure and heat at the interface produces a strong, clean, low-electrical-resistivity weld between the copper surfaces.

Practices are now provided for forming many such welds on pairs of copper conductor wires that have been shaped and assembled on the ferromagnetic core of an annular stator for an electric traction motor. As stated above, such conductor wires are somewhat U-shaped for placement into slots formed (for example) axially along the inner circumference of the stator core and spaced closely and regularly around its circumference. The bent (loop) portions of the several conductor wires are typically spaced and positioned around one end of the annular stator with the ends of the wires gathered in pairs and positioned at the other end of the annular stator. Often the pairs of conductor ends to be joined are positioned in concentric circular bands at one end of the stator assembly. In completing the intended electrical circuits in the stator many pairs of adjacent conductor wire ends are to be welded by our reaction metallurgical joining (RMJ) process. In order to facilitate the forming of scores of such welds in the assembly of a stator, we have devised practices for shaping and placing of thin layers of reactive metal between the many pairs of conductors, and we have devised practices for the shaping and use of welding electrodes in forming the welds.

In various embodiments of the invention the layer of reactive metal is prepared as rolls of long thin foils or strips that contain regularly spaced and sized reactive metal portions to supply and provide the thin layer of weld material for each pair of conductors to be welded. The spaced portions, for example, are sized to provide a desired amount of weld material when positioned between facing surfaces of each pairing of conductor ends. The sized reactive metal portions on such supply strip may be separated by perforations or by undersized, separating portions that may be discarded as the sized reactive metal portions are suitably and sequentially removed from the strip and placed for a RMJ operation. The placement of the reactive material may be done by automated machinery such as a robot. Such automated machinery may be used in combination with suitable resistance welding electrodes in positioning and separating the portions of reactive metal to be used in each weld. In other embodiments of the invention, individual thin foil portions of reactive material may be shaped, such as by bending (e.g., a "C" shape) for retrieval from a supply container and easy placement with a robot hand onto each pair of conductor wires to be welded. The shaped and flexible foil portions may serve to help retain the foil between closely spaced conductors until the conductors are pressed against the foil for welding. In other embodiments the reactive metal material may be prepared as a foil ring for placement between many pairs of conductor ends lying in a circular path in the rotor assembly. And in still other embodiments of the invention, sized and shaped foil portions may be carried, spaced apart, in a suitable disposable, non-metallic carrier strip for removal and placement for welding.

In other embodiments of the invention the resistance electrodes may be shaped with guides or other complementary, usually non-conductive members on or near the opposing electrode jaws for improving alignment of facing conductor bar pairs with the interposed reactive material. The resistance heating tool(s) may be shaped for welding two or more pairs of conductor bars at once; such as by inserting a conductive spacer member between aligned pairs to be welded. And in other embodiments a rolling welding tool may be used to progressively form welds between conductor pairs around the circumference of the stator end.

In each of these embodiments a stator may be suitably supported in a mechanism for positioning and assisting placement of reactive metal strips and contact with resistance welding tools.

Other objects and advantages of practices of the invention will be apparent from the following descriptions of illustrative embodiments of the invention. In some of these descriptions reference is made to drawing figures which are described in the following section of this specification.

BRIEF DESCRIPTION OF THE DRAWINGS

FIG. 5 illustrates the copper-to-copper welded interface with expelled reactive material and by-products at the edges of the weld.

DESCRIPTION OF PREFERRED EMBODIMENTS

Practices of this invention are applicable to the welding of a plurality of high electrical conductivity copper conductor bars in assembling and making a stator member for a high power electric motor such as may be used to drive or propel an electric or hybrid vehicle. But the invention may be adapted to welding other copper workpieces.

Figure 1:
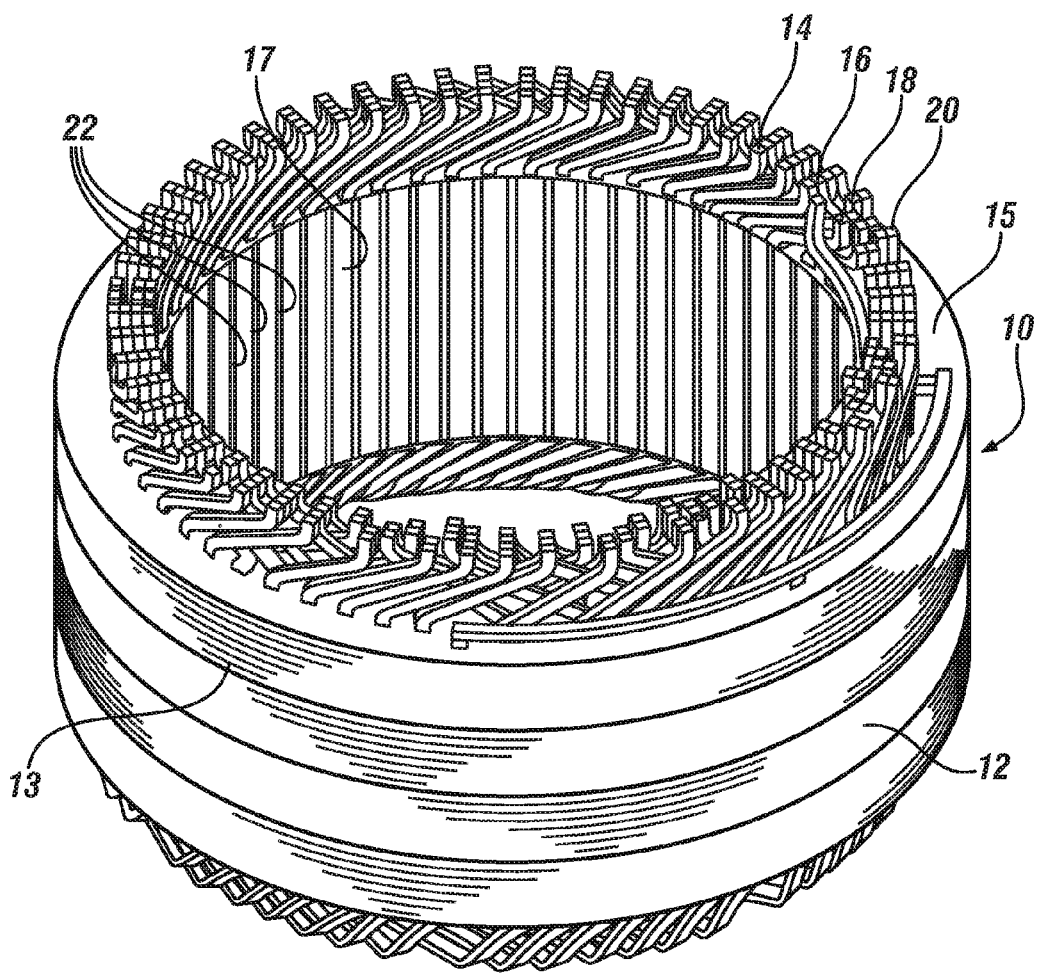
FIG. 1 is a perspective view of a stator with assembled, but unwelded, open-loop conductor wire piece conductors.

Such traction or drive motors are relatively large compared to other motors used on a vehicle and often require larger and more complicated components and methods of manufacture. For example, FIG. 1 illustrates an overall view of a representative partially assembled stator 10 for an electric traction motor. Details of the open-loop wire conductors are shown more clearly in the magnified partial view of FIG. 2.

Figure 2:
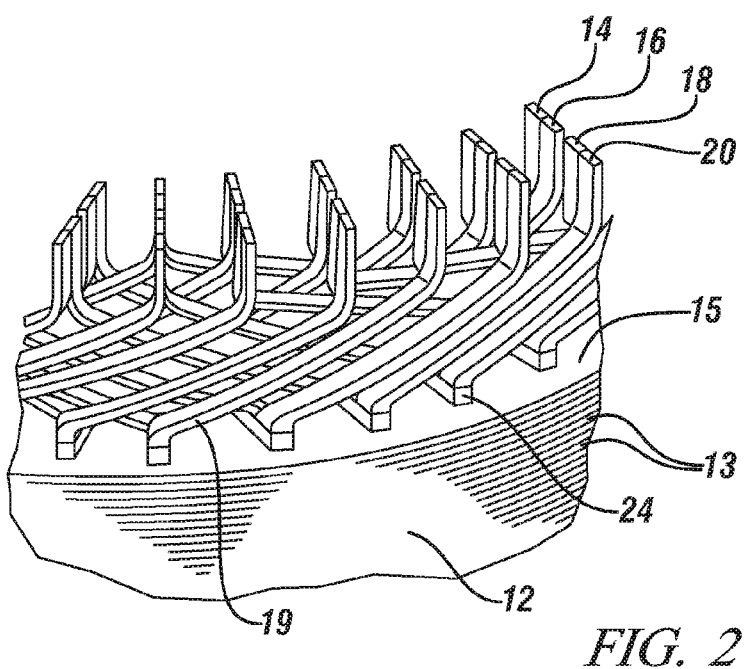
FIG. 2 shows, in greater detail, a portion of the stator of FIG. 1.

Stator 10 is formed of an annular shaped, stack 12 of ferromagnetic metal laminations 13 (further indicated at FIG. 2). In FIG. 1, the assembly is positioned so that one end surface 15 of stator 10 and inner circumferential surface 17 of the stack is visible. Many closely and regularly spaced slots 22 are formed to extend radially outwardly from the inner circumferential surface 17 and partially through lamination stack 12. The slots 22 are typically formed around the full inner circumference of the stator 10. Slots 22 are aligned co-axially with the axis of the stator and with the axis of rotation of an enclosed rotor in an assembled motor. The slots 22 are often lined with individual films of insulation material 24, best seen in FIG. 2. In the example illustrated in FIGS. 1 and 2, each slot 22 is filled with four commercial copper conductors such as open-loop wire conductors 19, but more or fewer conductors may be used (typically in pairs) without limitation. As shown in FIG. 2, the conductor bars 19 have rectangular cross-sections and they are shaped along their lengths such that when they are positioned in slots 22 of stator 10, the end portions of the four conductor bars, for example representative end portions 14, 16, 18 and 20 are in selected paired abutting relation such that end portion 14 abuts end portion 16 and end portion 18 abuts end portion 20 while end portion 16 is spaced apart from hairpin 18.

Conductor end portions 14 and 16 as well as end portions 18 and 20 of each of the many conductor bars 19 are to be pressed together and welded at their engaging facing surfaces. Thus, many welds are formed on adjacent open-loop wire conductor ends around the entire end surface 15 of the stator 10.

Figure 3:
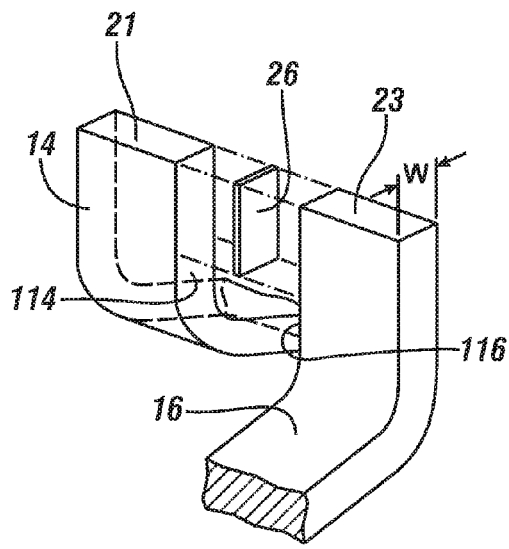
FIG. 3 is a fragmentary schematic illustration of the ends of two copper conductors placed with side surfaces in a facing position with a thin strip of a suitable reactive metal alloy positioned between them. The strip of reactive metal is sized and shaped to interact with the facing surfaces of the conductor wires that are to be cleaned and welded.
Figure 4:
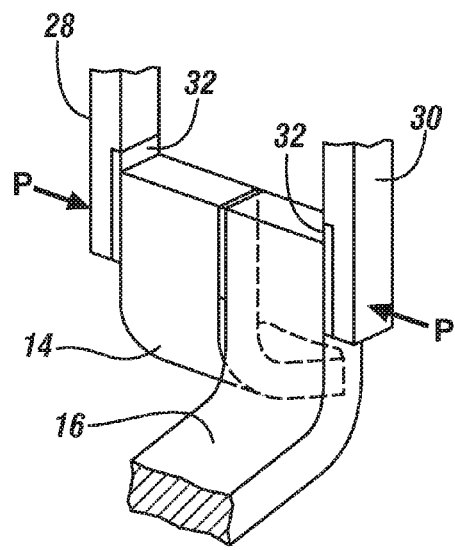
FIG. 4 is a schematic illustration of an apparatus (electrical resistance weld gun arms) for applying pressure to the copper conductor wires of FIG. 3 and heating them so as to cause the interposed reactive metal strip to melt, clean the facing copper surfaces, and to be squeezed from the interface to enable the formation of a weld between the copper conductors.
Figure 5:
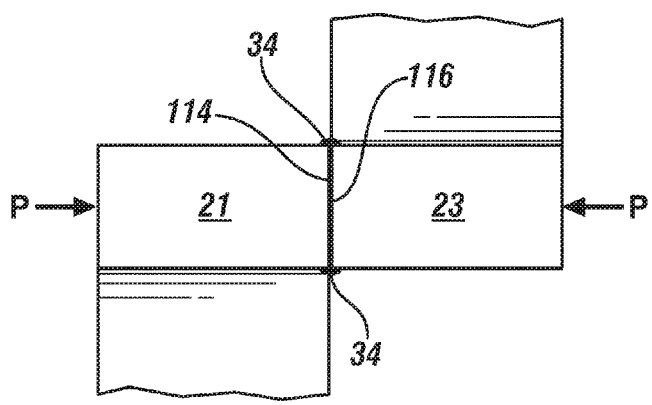
FIG. 5 is an enlarged schematic illustration of the ends of the copper conductor wire pieces of FIGS. 3 and 4.

FIGS. 3, 4, and 5 illustrate the RMJ welding process and its application to the welding of the ends of such conductor open-loop wire conductors. FIG. 3 is a fragmentary view of conductor end portions 14 and 16. In this example, closely-spaced conductor end portions 14 and 16, terminating in end surfaces 21, 23, have flat facing surface portions 114, 116 of like shape and area and the conductor end portions are so aligned and oriented that surface portions 114 and 116 if brought into contact, would be coextensive. A thin sheet piece of RMJ alloy 26 is placed such as to overlie the facing surface portions 114, 116. Conductor end portions 14 and 16 are formed of substantially pure copper. The sheet piece of RMJ alloy 26 is suitably an alloy of 93% by weight copper and 7% by weight phosphorus, and has a thickness of about 100 micrometers. RMJ alloy piece 26 has a shape that corresponds suitably to the facing surfaces 114, 116 of the conductor end portions 14, 16 that are to be welded to complete an electrical circuit path between them.

Figure 13:
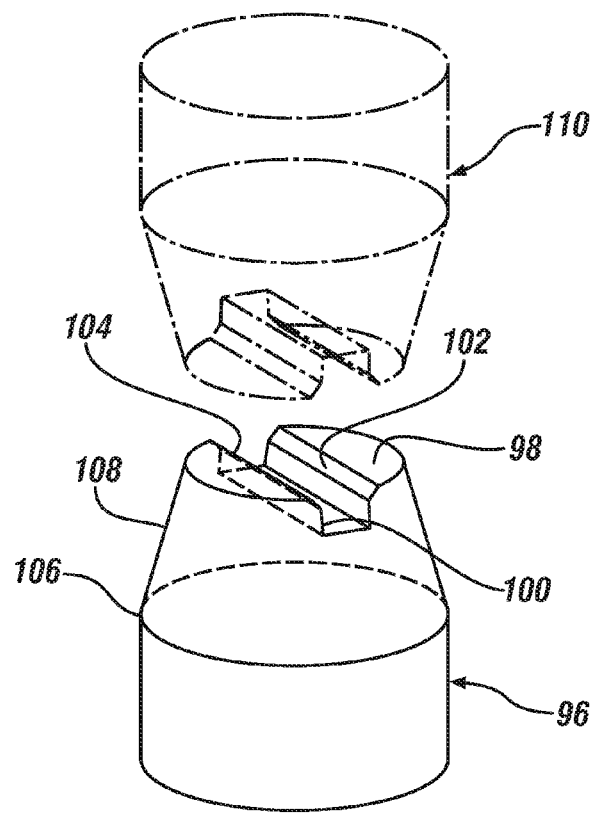
FIG. 13 shows, in perspective view of a pair of weld electrodes incorporating features to enforce alignment of conductor pairs prior to welding.

As illustrated in FIG. 4, a pair of opposing welding electrode jaws 28, 30 are pressed against opposite sides of conductor end portions 14, 16 under a load P, commonly of between 150 and 400 pounds, to heat their facing surfaces 114, 116 (FIG. 3) and the interposed reactive copper alloy sheet 26 by electric resistance heating. In the embodiment shown, welding electrode jaws 28, 30 are preferably provided with textured copper surfaces 32 for providing both good electrical contact with conductors 14, 16 and mechanical stability to the entire clamped assembly. In FIG. 4, welding electrode jaws 28, 30 have been depicted in a manner suitable for clearly showing the joint. But other electrode configurations and designs may be employed. Many alternative electrode designs, such as that shown at 96 and 110 in FIG. 13, are more robust and better suited for application of clamping loads P. A suitable electrical DC or AC current is delivered through the welding electrode jaws 28, and passed through conductor end portions 14, 16 their facing surfaces 114, 116, and RMJ alloy 26. The heat generated by passage of the current liquefies and reacts (not necessarily in that order) RMJ alloy 26 to dissolve and flux oxides and other non-copper elements from the surfaces of the essentially copper material at facing surfaces 114, 116. As illustrated in FIG. 5, the continuing application of pressure P to the heated facing surfaces 114, 116 expels reaction by-products from the interface which accumulate as by-product bodies 34 at the edges of the now solid-state welded facing surfaces 114, 116. By-product bodies 34 solidify after the welding current is stopped and the welded conductor workpieces cool.

In the assembly of a stator for an electric motor like that of FIG. 1, many such welds as shown in FIGS. 3, 4, and 5 are made between adjacent pairs of like shaped open-loop copper conductor workpieces and the maximum feasible rate of production of stators will be largely dictated by the rapidity with which this plurality of welds may be made. Thus, there is interest in practices and techniques which might automate at least some of the steps required to join these workpieces to promote higher production rates.

Some approaches and embodiments which may be effective in promoting enhanced production rates are summarized below and described in greater detail in subsequent sections:

place discrete volumes of RMJ alloy between the faying surfaces of the conductor pairs and heat and individually melt each RMJ volume using a modified resistance welding procedure, typically using only a single welding head.

feed RMJ alloy from a coil, tape or other extended volume of material, place the RMJ alloy between the faying surfaces of the conductor pairs and break off or melt off the volume of RMJ needed. Heating and melting is accomplished using a modified resistance welding procedure using either a single or several weld heads.

place RMJ alloy between the faying surfaces of all or a significant proportion of all conductor pairs. For example, for the four conductor configuration described previously, the RMJ alloy may be in the form of discrete volumes or a continuous length of alloy or suitably-spaced individual alloy segments supported on a flexible frame or similar carrier. Heating and melting is accomplished using a modified resistance welding procedure using either a single weld head or several weld heads.

place RMJ alloy between the faying surfaces of all or a significant proportion of all conductor pairs. In the case of the 4-open-loop conductor motor previously described this could involve welding the A-B conductor pairs and/or the C-D conductor pairs. The RMJ alloy may be in the form of discrete volumes or a continuous length of alloy or suitably-spaced individual alloy segments supported on a flexible frame or similar carrier. Heating and melting is accomplished using a modified resistance seam welding procedure using roller electrodes adapted to enable welding at only discrete locations and, optionally, incorporating guidance features to ensure hairpin to hairpin alignment.

Implementation of the first embodiment, that is, placing discrete volumes of RMJ alloy between the faying surfaces of the conductor pairs and heating and individually melting each RMJ volume using a modified resistance welding procedure, requires placement and retention of the RMJ before welding is initiated. A simple approach is to form, from roll or sheet RMJ, a weld tab like that shown as 40 in FIG. 6 with two sections 36 and 38 of similar length bent along bend axis 42 so that each of sections 36 and 38 is inclined with respect to the other. Such a configuration facilitates pickup and orientation by a robot end effector or similar gripper automation and enables accurate placement of either section 36 or 38, whichever is not gripped, between surfaces 114 and 116 (FIG. 3). Whichever section, 36 or 38, is gripped, it will not be in the electrical circuit through the workpieces and will remain solid as welding proceeds, while the other section will be melted off as welding proceeds. This will free the gripped section and release the gripper automation if it remains in place during welding or enable the gripped portion to fall away from the stator if the gripper automation has released tab 40 before the welding process is initiated. An air blast directed at a freely-falling gripper section will help ensure that it is not trapped in the stator during subsequent motor assembly and motor service.

Figure 6:
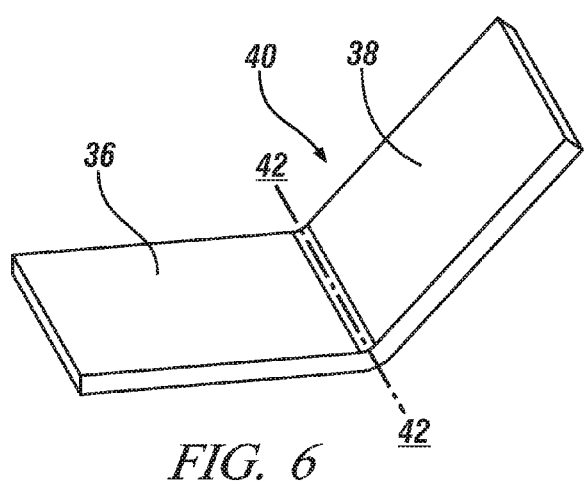
FIG. 6 illustrates an embodiment of a discrete portion of RMJ alloy adapted for robotic or automated pickup.

In a refinement of this embodiment the RMJ alloy may incorporate features to better enable the RMJ alloy to remain in place between the conductors if the gripper automation is removed before the workpieces are clamped by a welder. It will be appreciated that the configuration of facing surfaces 114 and 116 of conductor ends 14 and 16 (FIG. 3) may vary due to normal manufacturing variance. For example, facing surfaces 114 and 116 may not be parallel, and/or may be gapped to an extent which is greater than the thickness of tab 40 (FIG. 6). If this occurs it will be difficult to reliably retain tab 40 in position until welding pressure is applied to secure tab 40 in place.

Figure 7:
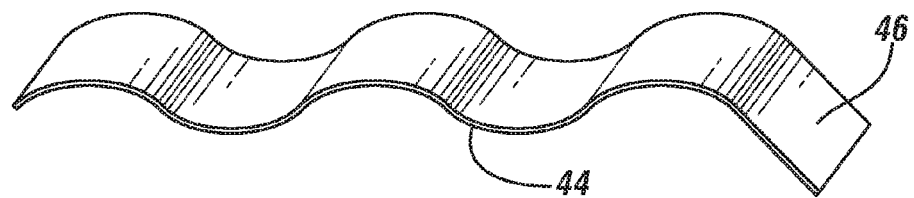
FIG. 7 illustrates another embodiment of a discrete portion of RMJ alloy adapted for robotic or automated pickup and incorporating flexible, curved features to frictionally retain the RMJ in position after installation between conductor pairs.

FIG. 7 shows an alternative design for the RMJ alloy volume. In this variant the body of the volume 44 is corrugated or has similar out-of-plane features. On insertion of the volume, it will flex when inserted between faces 114 and 116 and, in seeking to recover its original shape will generate a frictional force between the faces 114, 116 and volume 44 which will better retain volume 44 in position. As shown, body 44 also incorporates a gripper tab 46 but this may be eliminated if the corrugated character of the volume itself promotes reliable pick-up and gripping of the volume by the gripper automation.

Figure 8:
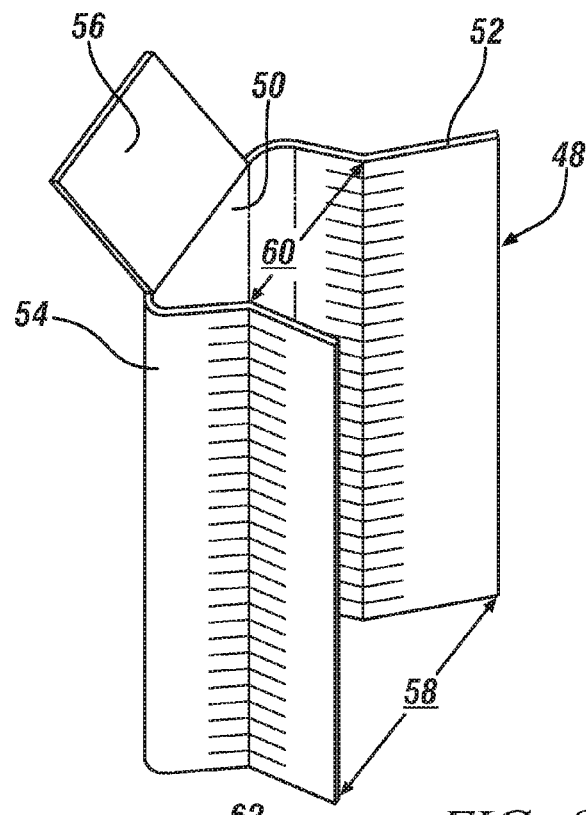
FIG. 8 illustrates a further embodiment of a discrete portion of RMJ alloy adapted for robotic or automated pickup and formed as a clip with features for engaging a conductor to retain the RMJ in position after installation between conductor pairs.

A third design is represented by RMJ volume 48 shown in FIG. 8. RMJ volume 48 is intended to clip onto one or both of hairpin connector ends 14, 16 with interior face 50 in contact with one or both of facing surfaces 114, 116. Sidewalls 52 and 54 are bent to form a wide opening 58 which tapers down to a narrower width 60 at about the midpoint of sidewalls 52, 54 before opening again at interior face 50. Width 58 is sized to accept the width of hairpin conductor ends 14, 16 so that clip 48 may be readily inserted while width 60 is sized to be less than the width of hairpin conductor ends 14, 16. Clip 48 may be positioned over conductor ends 14, 16 and advanced in the direction of arrow 62 so that after initial insertion the sides of conductor ends 14, 16 will engage the interior surfaces of sidewalls 52, 54 flexing them outward and generating a frictional force between the conductor ends and clip 48. Again, clip 48 incorporates a tab 56 to facilitate gripping of the clip by appropriate automation.

In each of the aspects and designs included in this embodiment, it is anticipated that the pressure will be applied by weld electrode jaws 28, 30 (FIG. 4). However, compared to a conventional spot welding process, especially if conducted on aluminum alloys, the energy demands and the applied pressures of the RMJ welding process are modest. And since the hairpin conductor ends are spaced at regular intervals it is feasible to employ a multiplicity of such electrode jaws, appropriately spaced apart and mechanically operated in parallel, to clamp more than one conductor end pair simultaneously. Once clamped, up to 4 RMJ welds may be made simultaneously or in rapid succession.

Figure 9:
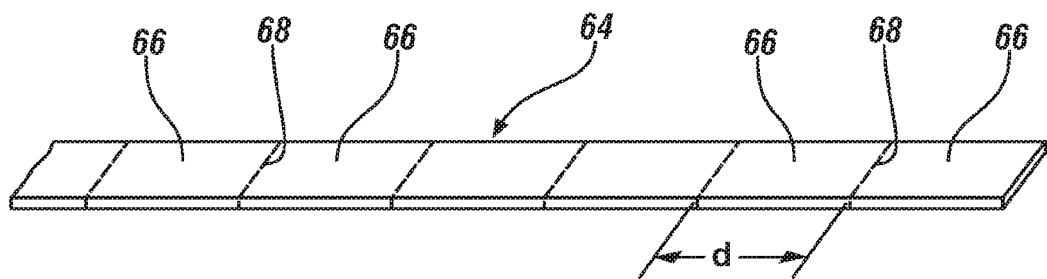
FIG. 9 illustrates a portion of a perforated tape of RMJ alloy for repeated use in the welding of many pairs of copper conductor wires.

An alternative embodiment for applying the RMJ alloy is to feed RMJ alloy from a coil, tape or other extended volume of material, place the RMJ alloy between the faying surfaces of the hairpin pairs and break off or melt off the volume of RMJ needed. Again, heating and melting may be accomplished using a modified resistance welding procedure employing either a single or several weld heads. FIG. 9 illustrates a fragment of a long strip 64 of pieces of RMJ alloy 66 for use in welding hairpin conductors 14, 16 as illustrated in FIGS. 3 and 4. In the example of FIG. 9, the individual reactive metal pieces 66 are separated by weakened line regions 68 which may be perforated or of reduced thickness or exhibit other suitable features for promoting easy separation between adjacent RMJ pieces 66. In preparing an assembly of hairpin conductors 14, 16 (FIGS. 3 and 4), strip 64 may be fed from a dispenser (not shown), by an increment approximately equal to the spacing d between weakened line regions 68, to advance a piece 66 of RMJ alloy. The piece of RMJ alloy may then be placed between hairpin conductor ends 14, 16 and pressure P applied (FIGS. 3 and 4). The dispenser (not shown) may then be suitably rotated and/or retracted to break off piece 66 from strip 64 at weakened line regions 68. Such an approach simplifies the process of feeding pieces 66 by eliminating the need to pick up, handle and place discrete pieces.

Another approach is to feed a foil strip. A solid foil strip similar to 68 without the perforations could be used. When placed between surfaces to be joined and heated, the portion lying within the gap would be melted, at which time the remaining solid strip could be retracted from the joint for later placement between the next pair of surfaces to be joined.

Figure 10:
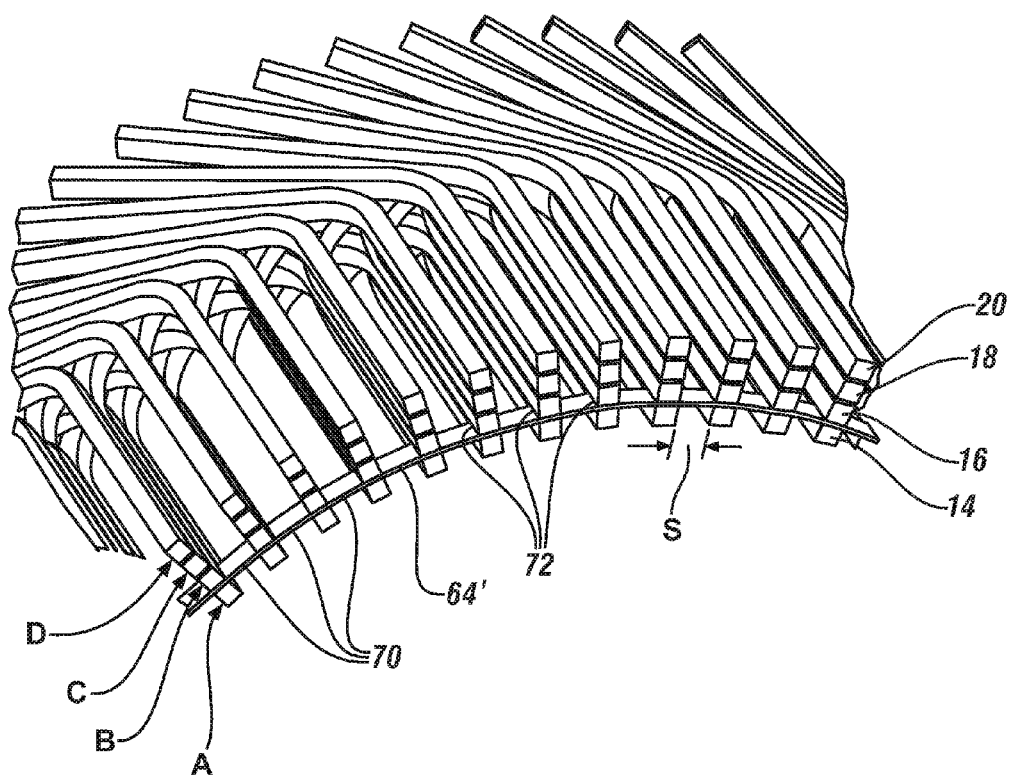
FIG. 10 shows, in perspective view, a number of assembled conductor pairs with a continuous length of RMJ alloy placed between like pairs of conductors.
Figure 11:
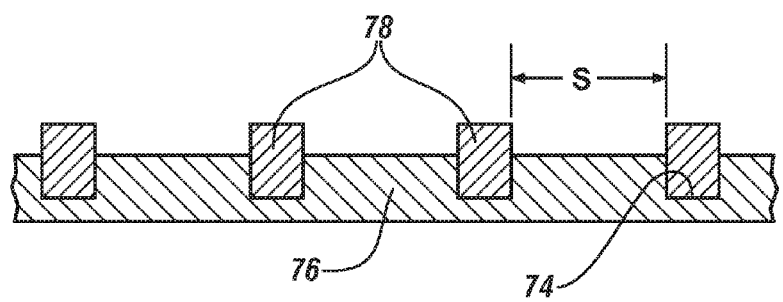
FIG. 11 shows a series of discrete portions of RMJ assembled on a slotted tape or carrier.

In another embodiment this approach may be extended to place the RMJ alloy in multiple conductor pairs. In FIG. 10, a continuous length of RMJ alloy 64' has been located between a series of hairpin conductor ends 14 and 16 so that when welded, an A-B connection will be made. In this exemplary depiction a continuous length of uniformly thick RMJ alloy is shown. While the continuous tape of RMJ alloy is inexpensive to produce, its use in this form is wasteful of alloy since as the alloy melts during welding, intervening sections 70 will separate and must be eliminated from the motor. For improved RMJ alloy usage, RMJ alloy length 64' could be fabricated with regions 70 as much thinner than sections 72 located between the hairpin conductors. Alternatively, as shown in FIG. 11, the RMJ alloy may be fabricated as rectangular 'buttons' 78 and mounted, for example using adhesive at their edges (not shown) in spaced-apart notches 74 separated by the spacing S between adjoining conductor pairs 14, 16, in an edge-notched tape 76 fabricated of paper or similar non-conducting, low cost, disposable carrier. Another such low cost disposable carrier may be a thin thermoplastic tape which may be readily melted and squeezed from the joint early in the heating process. Such a configuration has the advantage that the carrier could remain continuous and thus be more readily captured and removed from the stator at the conclusion of the weld operation. Also, since the carrier is non-conductive any carrier portion which is inadvertently not removed cannot promote any short circuit in the assembled motor. The edge-notched tape 76 has the advantage that none of the carrier tape will be trapped between conductors 14, 16, but, if this is not a consideration, for example because the carrier tape may be burned out or because the tape is too thin to interfere with the RMJ weld, a windowed tape with RMJ buttons mounted in each window may also be employed.

Figure 12:
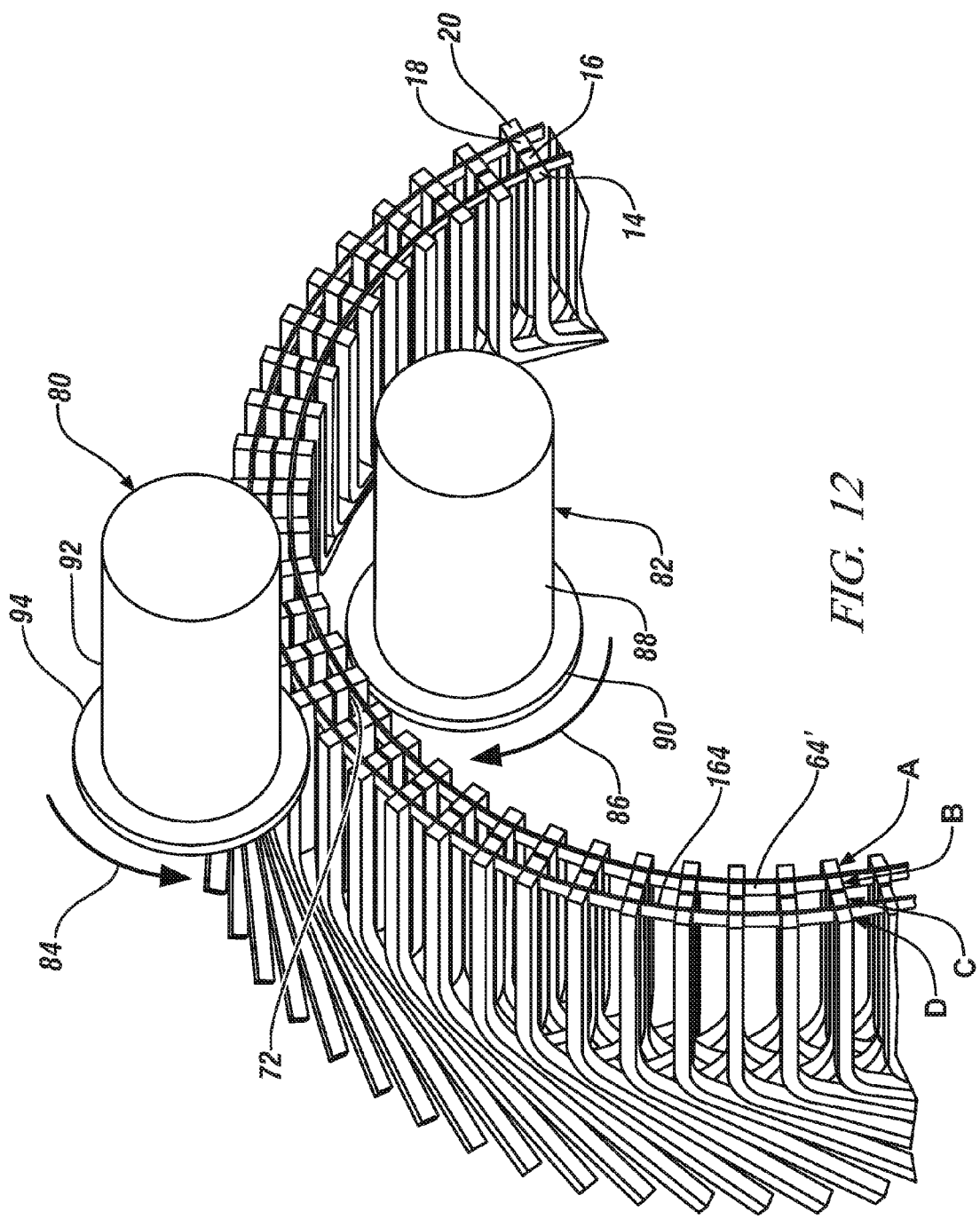
FIG. 12 shows, in perspective view, a schematic representation of the assembled conductor pairs with continuous lengths of RMJ alloy positioned between selected conductor pairs as in FIG. 10, and schematically illustrates how a pair of roller electrodes might be used to produce many RMJ welds around a stator.

FIG. 12 shows an embodiment in which conductive, contra-rotating roller electrodes 80, 82 are used to convey the weld current and apply pressure to the conductors 14, 16, 18 and 20. As shown, joints may be made between both conductors 14 and 16 and between conductors 18 and 20 by a single passage of electrodes 80 and 82. Electrodes 80 and 82 may be termed circular electrode wheels or as roller electrodes. Positioned between conductors 14 and 16 is a continuous length of RMJ alloy 64', while a second continuous RMJ conductor 164 is positioned between conductors 18 and 20. Electrode wheel 80, rotating in the direction of arrow 84 contacts conductor 20 in row D while electrode wheel 82, rotating in the direction of arrow 86 is in contact with conductor 14 in row A. Current will pass between wheel electrodes 80, 82, passing, in turn, through conductors 14 16, 18, 20 and through the RMJ alloy segments positioned between them, for example at 72. However, welding will only occur between conductors 14 and 16, and between conductors 18 and 20 because only there may a low temperature joint, facilitated by the added RMJ alloy, be made. No RMJ will be applied between conductors 16 and 18, so that these conductors, brought into contact by the pressure applied by wheel electrodes 80 and 82 will form a low resistance contact at their faying surfaces. This will reduce heating at the faying interfaces sufficiently to maintain the temperature at less than melting point of the conductors, so that no joint will be formed between conductors 16 and 18 even though it is in (electrical) series with the joint-forming conductor pairs 14 and 16 and 18 and 20 and so carries the same current. At the conclusion of the process a preferred gap between conductors 16 and 18 (rows B and C) may be established by driving a wedge between rows B and C by a prescribed amount depending on the wedge angle. An alternative may be to include a ring of a thin non-reactive but conductive member between conductors 16 and 18 (rows B and C)). The low temperature of the reaction process would prevent the ring from being welded to either of conductors 16 and 18 and would enforce a separation between them during the welding operation. After welding is complete, removal of the ring would create a gap between conductors 16 and 18, to guard against any electrical short circuit developing between them. The ring, after removal may be discarded or reused as appropriate.

In another variation, the rotational motion of roller or wheel electrodes 80 and 82 may be synchronized with the current control device such that when each pair of wires is properly aligned with the electrodes 80, 82, the electrodes 80, 82 stop turning and weld current is applied. With this approach there need be no compromise between electrode rotational speed and the time required to form a sound weld since each may be controlled independently Circular electrode wheels 80, 82 may be fabricated, as a single piece, with a disc-like cap 90, 94 supported on a smaller diameter shank 88, 92. This design limits the extent of machining required to reface the electrodes if excessive wear or mushrooming occurs on workpiece-contacting discs 90, 94 during use.

Electrodes 28, 30 (FIG. 4) and conductors 80, 82 (FIG. 12) serve to pass current and apply pressure to the joint. Such configurations are suitable for joints in which faces 114, 116 of hairpin connector ends 14, 16 (FIG. 3) are coextensive. But, in practice, it is possible that faces 114 and 116 are misaligned and not coextensive. Faces 114 and 116 may be displaced relative to one another, or rotated with respect to one another or may be both displaced and rotatably misaligned. It will be appreciated that in this circumstance the full extent of face 114 will not be welded to the full face of face 116, which decreases weld joint strength while increasing weld joint resistance resulting in more heat being generated in service. Any misalignment may be minimized by fixturing but even a simple fixture, such as a U-shaped or V-shaped device intended to urge the connectors into alignment adds additional steps to the process as well as further crowding the workspace.

Figure 14:
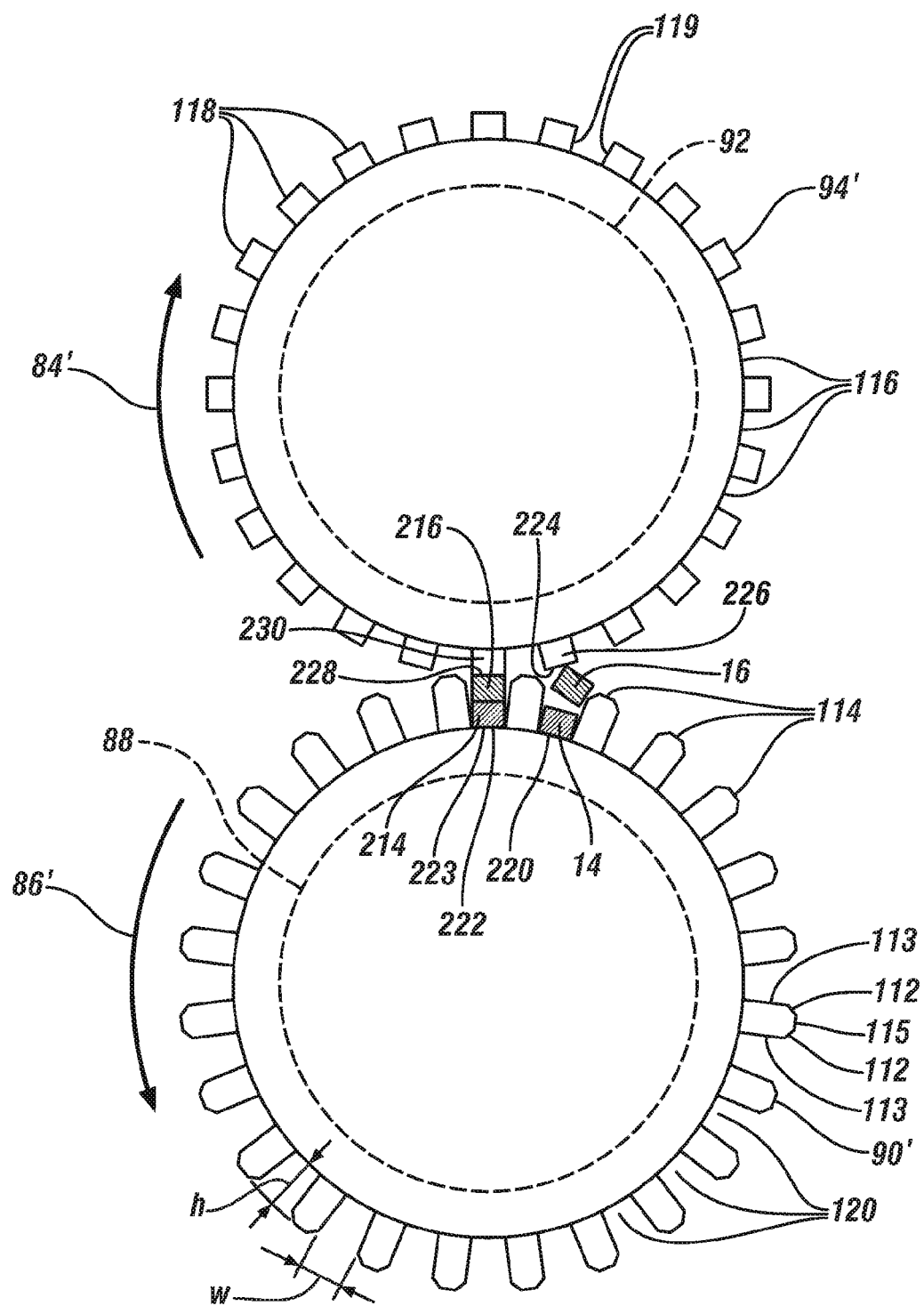
FIG. 14 shows a pair of roller weld electrodes incorporating features to enforce alignment of the conductor pairs prior to welding.

An alternative approach, an electrode design and configuration for minimizing misalignment is shown in FIGS. 13 and 14. FIG. 13 shows a modified tapered resistance spot welding electrode cap suited for aiding in the alignment of hairpin conductor ends like 14 and 16. Cap 96 fabricated of electrically and thermally conductive high copper alloy has internal structure, such as a female taper (not shown), so that it may be releasably attached to a weld gun and cooled by circulation of water in its interior. From face 98 to about the end of tapered cap section 108 marked by circumferential line 106, the cap is solid. Machined into cap 96 is slot 100 sized to accommodate, with minimal clearance, the width W (FIG. 3) of conductors 14, 16. Slot 100, as it approaches cap surface 98, widens and is bounded by tapered walls 102, 104. Tapered walls 102, 104 may optionally be coated or treated to enhance wear resistance, for example chromium plated, or to reduce friction, for example Teflon™ coated. Cap 96 and a matching aligned cap 110 positioned directly above it (shown in ghost) will serve to bring any misaligned conductor bars into alignment with one another. If the connector bars are aligned with one another and with slot 100, then the connector bars will remain aligned as they are brought into contact with the RMJ alloy and one another. If any of the electrodes or conductor bars is misaligned however the conductor bars will first contact one of tapered walls 102, 104 which, as electrodes 96, 110 continue to come together will urge and direct the conductor bars into alignment with slot 100 so that they are aligned prior to welding. The electrode structures may be sized and shaped so that, for a given set of conductor bars no electrode-electrode contact occurs when the electrodes are closed on one another, ensuring that current is conveyed only through the conductor (not shown) which occupies slot 100 of electrode 96 and its corresponding conductor located in the slot of electrode 110.

FIG. 14 shows a similar concept applied to circular electrode wheels 80, 82 (FIG. 12). In this embodiment the circumferences of workpiece contacting discs 90', 94' are segmented and arranged so that the protrusions 114 of disc 90' engage and partially extend into the openings or recesses 116 of disc 94' and protrusions 118 of disc 94' partially extend into openings or recesses 120 of disc 90'. Workpiece contacting surfaces are spaced apart so that a pair of conductors, for example 14, 16 (FIG. 3), may just be accommodated in the gap formed between protrusions and recesses under full engagement of the roller electrodes. Each of protrusions 114 of disc 90' is initially bounded by two linear, outwardly extending radial segments 113 which comprise about 70-80% of height h of the protrusions. The remaining 10-20% of height h consists of opposingly inclined segments 112 which terminate at surface 115 to form a truncated wedge shape. Recesses 120 of wheel electrode 90', formed by radial segments 113 of adjacent protrusions are sized to accommodate, with minimal clearance, the width W (FIG. 3) of conductors 14, 16. Protrusions 118 of wheel electrode 94' are flat topped segments bounded by radial segments 119 and suitably spaced apart that to accommodate, with minimal clearance, protrusions 114 of electrode 90'.

The operation of this wheel electrode pair 90', 94' may best be understood by consideration of the behavior of conductors 14, 16 as the conductors rotate. A pair of misaligned and separated conductors 14, 16 is shown with conductor 14 seated in recess 220 of conductor 90' and conductor 16, separated from conductor 14, in contact with the inclined segments 112 of one of the protrusions 114 which bounds recess 220. Rotation of conductors 90', 94' in the directions shown arrows 86', 84' respectively will bring end face 224 of protrusion 226 into contact with conductor 16, forcing it into recess 220 and, due to the urging of inclined segment 112, into alignment with conductor 14. At the conclusion of the process conductors 214 and 216 will be aligned in recess 222 and forced into in intimate contact with one another by the action of face 228 of protrusion 230 and face 223 of recess 222. Once this configuration is achieved weld current may be passed to melt the RMJ alloy (not shown in this figure) and initiate welding.

To avoid or minimize shunting currents which would diminish the weld current the array of protrusions 114 could be fabricated of at least a poor electrical conductor, preferably a non-conductor, so that current passes from face 228 though conductor pair 214, 216 and then passes to wheel electrode 90' through the base surface 223 of recess 222. For some geometries, 114 could be fabricated from high conductivity material and still obtain acceptable performance since the applied current will naturally follow the path of least resistance. It may be preferred to synchronize application of a voltage potential between electrodes 90', 94' or electrodes 90, 94 (FIG. 12) with rotation of the electrodes so that a voltage potential is applied, and current passes only when the conductors are aligned with the line joining centers of rotation of the electrodes. Such an approach would also minimize shunt currents. Alternatively, the dimensions of the motor and the electrodes may permit maintaining a potential between electrodes at all times and relying on system geometry to ensure that current will flow only between the conductors when they are in their welding position. In another variation, the electrodes 90' and 94' may have their rotational motion synchronized with the current control device such that when each pair of wires 214, 216 is properly aligned with the electrodes 90', 94' as shown in FIG. 14, the electrodes 90', 94' stop turning and weld current is applied. With this approach there need be no compromise between electrode rotational speed and the time required to form a sound weld since each may be controlled independently.

One simple device for supporting and aligning a stator is a cylindrical expandable collet sized, before activation, to slidably fit into the inner circumferential surface 17 of stator 10 (FIG. 1). Such collets commonly include a plurality of longitudinal slots and a drawbar attached to a device for enforcing reversible radial expansion of the collet. When the drawbar is actuated the collet expands so that its circumference engages the inner circumferential surface of the stator to center and secure the stator. De-actuation of the drawbar causes the collet to revert to its initial diameter and thereby release the stator. Such devices are well known to those skilled in the art and require no further consideration here.

Figure 15:
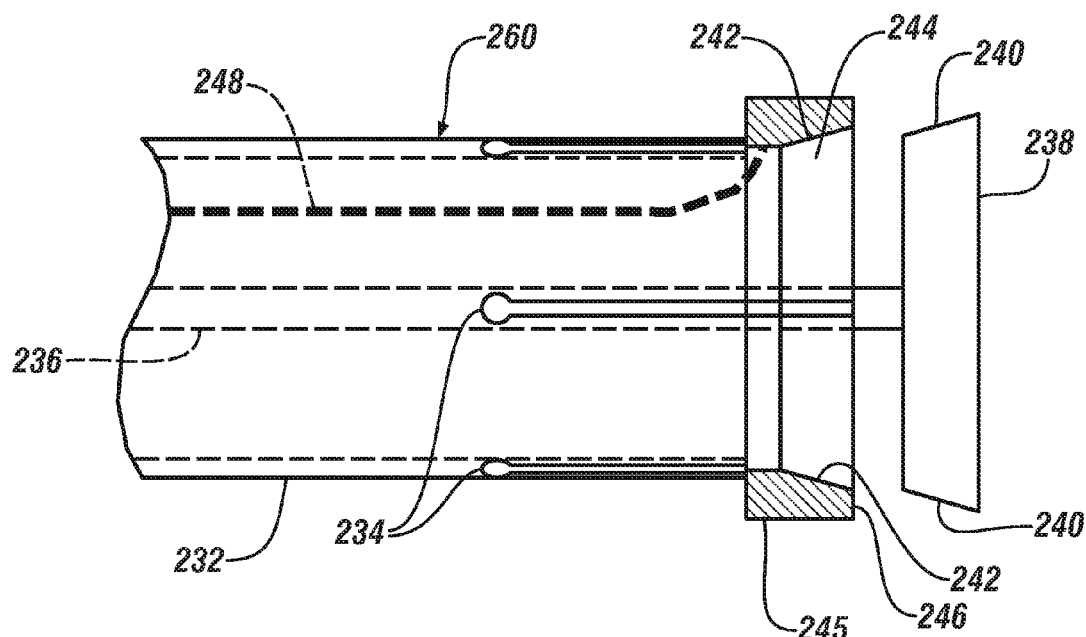
FIG. 15 shows a schematic sectional view of an expandable collet-based weld electrode.

However a variant of this concept may be used to develop a collet electrode and enable welding with only a single moving electrode. FIG. 15 shows such a collet electrode consisting of a collet 260 with thin walls 232 containing a plurality of slots 234 extending from face 246 partway along the length of the collet. Drawbar 236 operates tapered plug 238 whose walls 240 interferingly fit into cavity 244, applying radially outward pressure on cavity walls 242 and expanding the collet diameter. At end 246, collet 260 has a sleeve 245 of a suitable electrode material, for example high conductivity copper similarly slotted and so expandable with the collet body. Each of the electrode material segments will have a high current electrical connection to carry the weld current and complete the electrical circuit. For clarity only a single such connection is indicated at 248. Collet body 260 is fabricated of a suitable material so that the collet expansion is fully reversible on removing plug 238 from cavity 244. Hence, the outside diameter of the electrode material may be adjusted at will, within the range of action of the collet, by advancing and retracting drawbar 236.

By sizing the relaxed, that is with the drawbar in the position shown in FIG. 15, diameter of the electrode material to be slightly less than the diameter of the innermost, or A, conductors, collet electrode 260 may be inserted into the cylindrical volume defined by the up-thrust conductor ends. Then, expanding the collet will center it on the conductors and bring it into contact with all electrodes simultaneously. Effectively the collet electrode will simultaneously act for all row A conductors (see FIG. 12), like electrode 28 of FIG. 4. Hence only a single moving electrode for example 30 in FIG. 4 or 80 in FIG. 12 is required. If multiple welds are to be made simultaneously it may be advantageous to have pairs of moving electrodes arranged in opposition to limit the reaction load sustained by the collet electrode. It will be appreciated that the slots in collet electrode 260 may be made asymmetrical and/or that the stator may be positioned to ensure that no conductor pairs are aligned with the slots in the collet.

As was described in conjunction with the discussion of FIG. 12, the specific conductor pairs to be joined during this process will depend upon the placement of the RMJ alloy since any abutting conductor pairs without RMJ alloy between them will not weld.

Practices of the invention have been illustrated in practices of some preferred embodiments. But the scope of the invention is not limited to the illustrations.

The invention claimed is:

1. A method of joining a plurality of pairs of U-shaped, adjacent copper conductor wires that are assembled into a stator core for an electric motor, the stator core having the shape of a hollow right cylinder with an axial length for enclosing a rotor for the electric motor, the ends of the U-shaped copper conductor wires being arranged as a plurality of aligned pairs, the paired ends of the assembled copper conductors all being located at one end of the stator core and occupying the annular area of one end of the stator core in spaced radial pairings, where the end of one member of each copper conductor pair presents a first joining surface area facing a like-shaped, like-oriented, second joining surface of the end of its paired copper conductor member, each of the paired joining ends of the copper current collectors extending outwardly beyond the axial length of the stator core and so being accessible for welding at the one end of the hollow right cylinder shape; the method of forming the solid state welds comprising:
   a) inserting reactive metal between the joining surface areas of more than one pair of selected adjacent copper conductors;
   b) using opposing electrode tools to apply pressure to each of the copper conductor pairs to either simultaneously or sequentially bring the facing joining surface areas of each pair of copper conductors into engagement with the reactive metal between them;
   c) passing electric current through the engaged, conductor-reactive metal-conductor grouping to heat and melt the reactive metal for reaction with the copper conductor surfaces, to form reaction by-products;
   d) expelling the reaction by-products from the facing, contacting joining surface areas of each of the copper conductor pairs to form a solid-state weld;
   e) stopping passage of the electric current; then
   f) repositioning either the opposing electrode tools or the stator to align at least a different conductor pair with the opposing electrode tools and repeating at least steps b)-e) until all copper conductor pairs have been joined together by solid-state welds.

2. The method of forming solid state welds as recited in claim 1 in which a length of reactive metal foil is inserted between multiple pairs of copper conductors assembled in a circular band on the stator core.

3. The method of forming solid state welds as recited in claim 2 in which the length of reactive metal foil is selected so that it may be inserted between all of the pairs of copper conductors assembled in a circular band on the stator core.

4. The method of forming solid state welds as recited in claim 1 in which a plurality of spaced apart foil portions of reactive metal are positioned along a preformed length of, and separated by, sacrificial portions of less reactive material, the sacrificial portion spacing being substantially equal to the conductor pair spacing, the foil portions being positioned so that each reactive metal foil portion is inserted between the joining surfaces of the adjacent copper conductors.

5. The method of forming solid state welds as recited in claim 1 in which a plurality of spaced apart reactive metal segments with a spacing substantially equal to the conductor pair spacing is assembled on an electrically non-conductive carrier strip, the strip being inserted between a number of conductor pairs equal to the number of reactive metal segments and the reactive metal segments are positioned so that each segment is located between the joining surfaces of the adjacent copper conductors.

6. The method of forming solid state welds as recited in claim 1 in which individual portions of reactive metal are placed between each of the plurality of pairs of copper conductors.

7. The method of forming solid state welds as recited in claim 6 in which the individual portions of reactive metal are successively removed from a preformed length of reactive metal comprising features to facilitate removal of reactive metal portions of substantially consistent shape and size.

8. The method of forming solid state welds as recited in claim 6 in which the individual reactive metal portions are progressively removed from a length of non-metallic carrier material to which the reactive metal portions are removably attached.

9. The method of forming solid state welds as recited in claim 6 in which an adherent coating of reactive metal is deposited on the facing conductor joining surfaces.

10. The method of forming solid state welds as recited in claim 6 in which the individual reactive metal portions are shaped for gripping and removal from a reservoir of such portions by an automated machine and for placement between a pair of copper conductors.

11. The method of forming solid state welds as recited in claim 10 in which each individual reactive metal portion is bent in a non-flat shape for insertion under temporary compressive fitting between closely spaced, facing conductor joining surfaces before the conductor joining surface surfaces are brought into engagement with the electrodes for heating and welding.

12. The method of forming solid state welds as recited in claim 1 in which the reactive metal is inserted between the facing surfaces of the copper conductors as a foil portion having a thickness no greater than about 250 micrometers.

13. The method of forming solid state welds as recited in claim 1 in which the opposing electrical resistance heating electrode members have guide surfaces for contacting adjacent copper conductors and aligning them against the reactive metal.

14. The method of forming solid state welds as recited in claim 1 in which opposing electrical resistance heating electrodes engage outer, non-adjacent conductors of two aligned pairs of copper conductors, with foil portions of reactive metal placed only between joining surfaces of conductors to be welded to enable the simultaneous but separate welding of the two conductor pairs.

15. The method of forming solid state welds as recited in claim 14 further comprising placing a non-reactive, electrically-conductive body between the two conductor pairs to enforce separation of the two conductor pairs and removing the non-reactive body after welding is complete to ensure electrical isolation of the two conductor pairs.

16. The method of forming solid state welds as recited in claim 1 in which adjacent pairs of copper conductors are assembled on an annular stator core with a central axis, the copper conductors being arranged in a circular band coaxial with the axis of the stator, and a pair of opposed circular electrode wheels rolling circumferentially around opposite sides of the band and acting radially with respect to the circular band are used to progressively bring the facing joining surface areas of the conductor pairs into engagement and to heat each engaged pair for welding.

17. The method of forming solid state welds as recited in claim 16 in which heating is effected by passage of electric current from one of the pair of electrodes through the copper conductors and the interposed reactive metal to the second electrode of the electrode pair, the passage of current being synchronized with the electrode rotation to enable passage of current only during the period when the facing surface areas of the conductor pairs are engaged.

18. The method of forming solid state welds as recited in claim 1 in which two radial sets of adjacent pairs of copper conductors are assembled on an annular stator core in a circular band coaxial with the axis of the stator, and a first circular loop of foil portions coaxial with the axis of the stator is placed between radially inward pairs of copper conductors in the coaxial circular band and a second circular loop of foil portions coaxial with the axis of the stator is placed between radially outward pairs of copper conductors in the coaxial circular band; and opposing electrodes moved circumferentially around the conductor pairs and acting radially with respect to the circular band are used to progressively bring the facing joining surface areas of the radially inward and outward conductor pairs into engagement and to simultaneously heat each engaged pair for welding.

19. The method of forming solid state welds as recited in claim 18 in which the opposing electrodes comprise a pair of spaced apart, counter-rotating circular electrode wheels, each wheel having a center and each wheel rotating about its center, the wheel spacing being selected to bring the facing joining surface areas of each of the conductor pairs into substantially full contact.

20. The method of forming solid state welds as recited in claim 1 in a radial set of pairs of copper conductors assembled on a stator core in a circular band, the stator having an axis, the circular band being coaxial with the axis of the stator, and foil portions are inserted between the pairs of copper conductors in the coaxial circular band;

the stator having a shaped opening radially inward of the circular band and coaxial with the cylinder axis, the stator core being supported on the shaped opening; and opposing electrodes moved circumferentially around the conductor pairs and acting radially with respect to the circular band are used to progressively bring the facing joining surface areas of the conductor pairs into engagement and to simultaneously heat each engaged pair for welding.

21. The method of forming solid state welds recited in claim 17 in which the conductor-contacting surface of the electrode comprises features to guide and align the electrodes into alignment.

22. A method of forming solid-state welds between surfaces of a plurality of pairs of adjacent, high-conductivity copper U-shaped hairpin conductors, each hairpin conductor having two ends and being assembled on a stator core for an electric motor, the conductor pairs being electrically isolated from each other and spaced apart from neighboring conductor pairs, where one member of each copper conductor pair is an end of a first hairpin copper connector and presents a first joining surface area to a facing second joining surface area of a like-oriented end of a second hairpin copper conductor, the surface facing areas of the assembled copper conductors being accessible at a surface of the stator core; the method comprising:

positioning a plurality of spaced apart reactive metal portions mounted on a support between the joining surface areas of a plurality of pairs of adjacent copper conductors;

using opposing electrode tools to apply pressure to the copper conductor pairs and bring the facing joining surface areas of each pair of copper conductors into engagement with the foil portion between them;

passing electric current through the engaged conductor-reactive metal-conductor group to heat and melt the interposed reactive metal foil for reaction with the copper conductor surfaces to form reaction by-products;

expelling the reaction by-products from the facing, contacting joining surface areas of each of the copper conductor pairs to form a solid-state weld;

stopping passage of the electric current and removing the reactive metal support from the stator; then, repeating the above steps until all of the plurality of pairs of adjacent copper conductors are welded.

23. The method of forming solid-state welds between surfaces of a plurality of pairs of adjacent, like-shaped copper conductors assembled on a stator core for an electric motor as recited in claim 22 in which the reactive metal support is electrically non-conductive.

\* \* \* \* \*